(12) United States Patent
Hurtta et al.

(10) Patent No.: US 7,478,159 B2
(45) Date of Patent: Jan. 13, 2009

(54) POLICY INFORMATION IN MULTIPLE PDFS

(75) Inventors: Tuija Hurtta, Espoo (FI); Ralitsa Gateva, Kirkland, WA (US)

(73) Assignee: Nokia Corporation, Espoo (FI)

( * ) Notice: Subject to any disclaimer, the term of this patent is extended or adjusted under 35 U.S.C. 154(b) by 797 days.

(21) Appl. No.: 10/757,435

(22) Filed: Jan. 15, 2004

(65) Prior Publication Data

US 2004/0205193 A1    Oct. 14, 2004

Related U.S. Application Data

(60) Provisional application No. 60/448,491, filed on Feb. 21, 2003.

(51) Int. Cl.
*G06F 15/16* (2006.01)
(52) U.S. Cl. .................. 709/227; 709/223
(58) Field of Classification Search ............ 709/223, 709/227; 370/230.1, 395.2
See application file for complete search history.

(56) References Cited

U.S. PATENT DOCUMENTS

2002/0036983 A1* 3/2002 Widegren et al. ........ 370/230.1
2005/0210141 A1* 9/2005 Oyama et al. ............... 709/228

FOREIGN PATENT DOCUMENTS

WO  WO 01/59986  8/2001
WO  WO 01/91389  11/2001

OTHER PUBLICATIONS

3GPP (Global System for Mobile Communications) TR 23.917 vo.4.1, "3rd Generation Partnership Project; Technical Specification Group Services and System Aspects; Dynamic Policy control enhancements for end-to-end QoS", Dec. 2002, pp. 1-20.
3GPP—TS 29.207 v5.0.0, "3rd Generation Partnership Project; Technical Specification Group Core Network; Policy control over Go interface", Jun. 2006, pp. 1-45.

(Continued)

*Primary Examiner*—Tonia L Dollinger
*Assistant Examiner*—Kyung H Shin
(74) *Attorney, Agent, or Firm*—Squire, Sanders & Dempsey, LLP

(57) ABSTRACT

The invention proposes a method for establishing sessions in a network comprising a user entity, a network control node and a plurality of network nodes storing subscriber specific information, the method comprising the steps of receiving a session establishing request at the network control node, forwarding a policy request message from the network control node to each network node of the plurality of network nodes storing subscriber specific information comprising policy information required for the session to be established, processing the policy request message to generate a policy decision message and sending the policy decision message to the network control node from each of the network nodes having received the policy request message, generating a single policy decision confirmation message based on the received policy decision messages in the network control node, and sending the single policy decision message to the user entity.

19 Claims, 2 Drawing Sheets

OTHER PUBLICATIONS

L-N. Hamer, et al. (Nortel Networks) H. Shieh (AT&T Wireless) R. Zwart (AT&T)—Internet Draft, "COPS-PR for outsourcing in UMTS: UMTS Go PIB", Nov. 12, 2001, pp. 1-28.

3GGP TR 23.917V0.4.1; "3rd Generation Partnership Project; Technical Specification Group Services and System Aspects; Dynamic Policy control enhancements for end-to-end QoS"; Release 6; Global System for Mobile Communications; Dec. 2002; pp. 1-20.

P. Calhoun et al.; Internet Draft; Standards Track; "Roamops Authentication/Authorization Requirements"; Mar. 1999; pp. 1-8.

3GPP TR 23.917V0.5.1; "3rd Generation Partnership Project; Technical Specification Group Services and System Aspects; Dynamic Policy control enhancements for end-to-end QoS"; Release 6; Global System for Mobile Communications; Feb. 2002; pp. 1-24.

Official communication issued in the corresponding International Application No. PCT/IB2004/000412; dated Sep. 2, 2004.

Official communication issued in the corresponding International Application No. PCT/IB2004/000412; dated Nov. 2, 2004.

Official communication issued in the corresponding International Application No. PCT/IB2004/000412; dated Dec. 3, 2004.

* cited by examiner

POLICY INFORMATION IN MULTIPLE PDFS

The present application claims the benefit of priority of provisional application Ser. No. 60/448,491, filed Feb. 21, 2003, the contents of which are incorporated herein by reference.

FIELD OF THE INVENTION

The present invention relates to a method and a network element for handling policy information in multiple network nodes storing subscriber specific information, e.g., PDF (Policy Control Functions or Policy Decision Functions, also abbreviated as PCF).

BACKGROUND OF THE INVENTION

As described above, the present invention relates to handling of policy information. Such a handling is necessary in case a user would like to establish a session (e.g., a multimedia session) in which for the establishment additional information are required. Such additional information could be, for example, services required for the session, addresses of particular servers necessary for the session, information regarding handling of the session or whether the user is entitled to use the corresponding services necessary for the session. Moreover, also charging and/or billing information can be included.

The handling of policy information is carried out in a Policy Control Function (PDF). This is a logical policy decision element that uses standard IP (Internet Protocol) mechanisms to implement policy in the IP media layer. The PDF makes decisions in regard to network based IP policy using policy rules, and communicates these decisions to a GGSN (Gateway GPRS Support Node, GPRS=General Packet Radio Service), which serves the UE (user entity) of the user/subscriber. In detail, the decisions are communicated to a Policy Enforcement Point (PEP) located in the GGSN. This is a logical entity that enforces policy decisions made by the PDF. Between the GGSN and the PDF, a so-called Go interface is defined. Further details on PDF and policy control over Go interface can be found in ETSI TS 29 207 V5.0.0 (2002-06), for example.

In the following, a session authorization mechanism carried out on establishing a session is described briefly.

When a UE wishes to establish a session, it sends a set-up request (e.g., SIP INVITE) to the P-CSCF. This set-up request indicates e.g., the media streams to be used. The P-CSCF sends the necessary information to the PDF which makes a decision on the request, i.e., authorizes the session or does not authorize the decision. This decision is included in a response called "authorization token" which is subsequently used by the PDF in order to identify the session and the media it has authorized.

The P-CSCF sends a corresponding response to the UE which includes a description of the negotiated media together with the authorization token from the PDF. After this, the UE issues a request (for example, a PDP context activation) to reserve the resources necessary to provide a required QoS (Quality of Service) for the media stream. In this request, the authentication token from the PDF provided via the PDF and Flow Id(s) (flow identifier(s)) identifying the flow(s) on the PDP context are included.

The GGSN receives the reservation request and sends a policy decision request to the PDF in order to determine if the resource request should be allowed to proceed. Included in this request are the authentication token and the Flow Id(s) provided by the UE. The PDF uses this authorization token and the Flow Id(s) in order to correlate the request for resources with the media authorization previously provided to the P-CSCF. After this, the PDF sends a decision to the GGSN. Then, the GGSN sends a response to the UE indicating that the resource reservation is complete. Thus, the session can be started.

As to the function of the Authorization Token and the Flow Id(s), it is noted that in 3GPP R5, the Authorization Token and Flow Id(s) are used as binding information. The Authorization Token is also used to derive the IP address of the PDF storing the policy information.

In 3GPP (Third Generation Partnership Project) R5 (Release 5), the PDF is part of a P-CSCF (Proxy Call Session Control Function). The P-CSCF is a network element providing session management services (e.g., telephony call control).

In the next release, namely 3GPP R6, separating the PDF from the P-CSCF will be studied. That is, in such an environment, the PDF is independent from the P-CSCF, as described in 3GPP TR 23.917V0.4.10 (2002-12), for example. Therefore, a plurality of PDFs may be arranged, in order to handle policies for different kinds of sessions, for example.

It is possible that in the future there is a N-M relation between the P-CSCF and the PDF, i.e., that there is a plurality of P-CSCF and a plurality of PDF related to each other. This N-M relation is already in 3GPP R5 between the GGSN and the PDF. For the P-CSCF, this means that it could send session information to many PDFs. This could be done either on session basis e.g. by using a simple round-robin mechanism. Or then the P-CSCF could consider the load of the PDFs and could send session information to the least loaded PDF. As an alternative, the P-CSCF could also send session information on UE basis, e.g. so that information on all sessions of a UE would be sent to the same PDF. And yet as another alternative, session information of roaming UEs could be sent to certain PDFs, whereas session information of home UEs would be sent to other PDFs.

It is possible that in the future, the P-CSCF is served by one PDF and one PDF serves many P-CSCFs (1 to N relation). In that case, when the UE is served by many P-CSCFs for different application sessions, the same problems as described above may occur.

As described above, the PDF derives policy information from the received session information. If session information of a UE may reside in multiple PDFs, requesting policy information becomes more complex.

SUMMARY OF THE INVENTION

Thus, the object underlying the present invention resides in providing a mechanism, by which in a system comprising a plurality of nodes storing specific subscriber information (e.g., PDFs) an easy handling of policy information is possible.

This object is solved by a method for establishing sessions in a network comprising a user entity, a network control node and a plurality of network nodes storing subscriber specific information, the method comprising the steps of receiving a session establishing request at the network control node, forwarding a policy request message from the network control node to each network node of the plurality of network nodes storing subscriber specific information which comprise policy information required for the session to be established, processing the policy request message to generate a policy decision message and sending the policy decision message to the network control node from each of the network nodes having received the policy request message, generating a single policy decision confirmation message based on the received policy decision messages in the network control node, and sending the single policy decision message to the user entity.

Alternatively, the object is solved by a system for establishing sessions in a network comprising a user entity, a network control node and a plurality of network nodes storing subscriber specific information, wherein the network control node comprises means for receiving a session establishing request, and for forwarding a policy request message to each network node of the plurality of network nodes storing subscriber specific information comprising policy information required for the session to be established, the nodes storing subscriber specific information comprise means for processing the policy request message to generate a policy decision message and for sending the policy decision message to the network control node, and the network control node comprises means for generating a single policy decision confirmation message based on the received policy decision messages, and for sending the single policy decision message to the user entity.

Thus, according to the invention, a network control element contacts a plurality of nodes storing subscriber specific information (e.g., PDFs). This network control element provides the contact with the user entity, such that only a single request message is required which includes policy information for the plurality of nodes. Likewise, only a single decision message is necessary which comprises all policy decisions of the plurality of nodes.

Hence, the handling of policy information from the viewpoint of the user entity is as simple as in the prior art, namely, only single messages are required although now a plurality of nodes are provided.

That is, although the structure comprising a plurality of nodes storing subscriber specific information (e.g., PDFs) is more complex that in the prior art according to which only one node is present, the handling of the policy information does not become complicated.

The network control element may be itself a network node of the plurality of network nodes storing subscriber specific information. That is, one of the network nodes storing subscriber specific information (e.g., PDF) controls the other PDFs.

Alternatively, the network control element may be a network service element serving the user entity. For example, the network service element may be a GSGN.

If network control element may be itself a network node of the plurality of network nodes storing subscriber specific information, the network control element may be selected by network connection serving element serving the user entity. For example, a default network node storing subscriber specific information may be selected. That is, for example a GSGN selects the one PDF of a plurality of PDFs.

The single policy decision message may comprise an authorization token from each node storing subscriber specific information. That is, all necessary authorization tokens are sent in the single message, such that no multiple messages for conveying the authorization tokens are required.

When the user entity is located in a visited operator domain, the following steps may be carried out: inserting policy information into a session set-up protocol message, sending the session set-up protocol message to a network control element in the home domain of the user entity, forwarding the policy information to a home subscriber database node, extracting an address of a home node storing subscriber specific information of the user entity from the subscriber database node, creating home policy information based on the extracted address, and forwarding the home policy information to a network control element of the visited network.

In terms of the system, the user entity may further comprise means for inserting policy information into a session set-up protocol message, and for sending the session set-up protocol message to a network control element in the home domain of the user entity, the network control element in the home domain of the user entity may comprise means for forwarding the policy information to a home subscriber database node, the home subscriber database node may comprises means for extracting an address of a home node storing subscriber specific information of the user entity, the network control element in the home domain of the user entity may comprise means for creating home policy information based on the extracted address, and for forwarding the home policy information to a network control element of the visited network.

In this way, also the situation can be handled that a subscriber is roaming. Namely, the necessary policy information are sent during a session set-up to a home subscriber database node, and a network control element of the visited network is provided with necessary information.

The policy information may comprise an authentication token in general, so that the created home policy information may comprises a home Authentication Token.

Furthermore, the network control element of the visited network may create a visited policy information. That is, when roaming, there might be two different kinds of policy information, namely home and visited policy information.

The home policy information may be inserted into another session set-up protocol message.

The session set-up protocol used for the above-referenced session set-up may be a Session Initiation Protocol (SIP).

DETAILED DESCRIPTION OF THE INVENTION

In the following, preferred embodiments are described by referring to the enclosed drawings.

As described in the foregoing, the present invention is directed to the case that a plurality of PDFs (as examples for nodes storing subscriber specific information) are present which are independent from the P-CSCF.

According to a preferred embodiment of the invention, the GGSN contacts only one PDF and this selected PDF then contacts other PDFs if information on all sessions of a UE is not sent to the same PDF.

Figure 1:
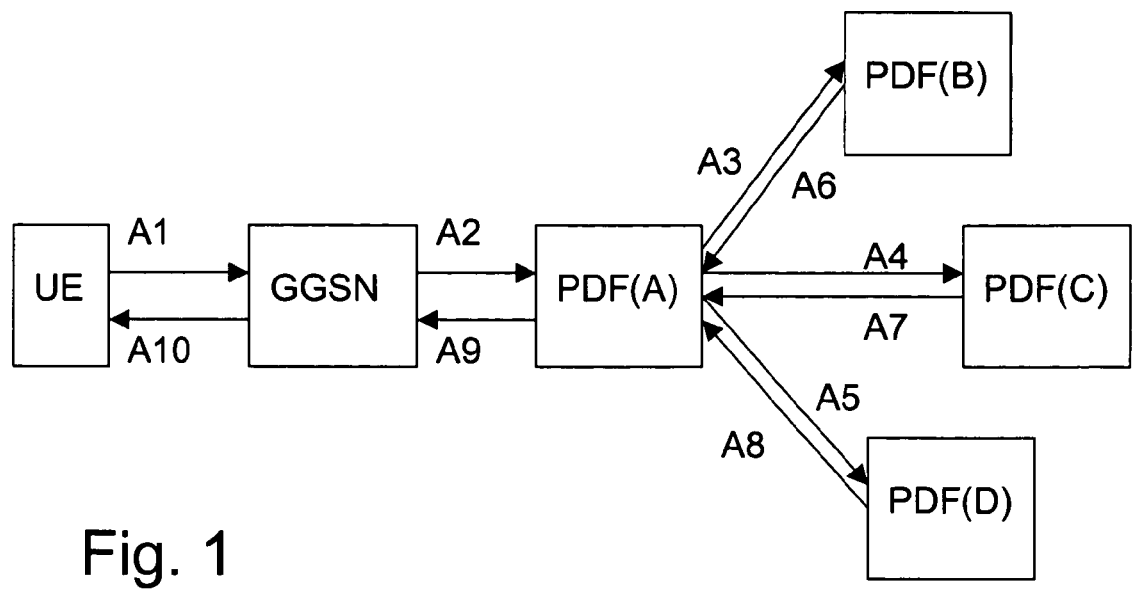
FIG. 1 shows a block diagram illustrating the procedure according to a first embodiment of the invention.

This situation is illustrated in the block diagram shown in FIG. 1. It is noted that FIG. 1 only shows the principle necessary for understanding the invention, so that network elements required for establishing a connection but which are not essential for describing the invention are omitted for simplifying the illustration.

In detail, FIG. 1 shows a network system in which a plurality of PDFs (PDF(A), PDF(B), PDF(C), PDF(D)) are provided. In a message A1, the UE requests set-up of a session. Included in this message are a plurality of Authorization Tokens for the multiple PDFs, and also Flow Id(s). The GGSN takes only one of the Authorization Tokens (e.g. first or last) and determines the IP address of the PDF with that. In the illustrated case, it is assumed that the GGSN takes only the Authorization Token for PDF(A). The GGSN does not determine the IP addresses of the other PDFs (i.e., PDF(B), PDF (C) and PDF(D)).

The GGSN then sends a COPS (Common Open Policy Service) Request message (indicated by A2 in FIG. 2) to the selected PDF(A) with all the binding information (in particular, including all Authorization Tokens) sent by the UE to the GGSN. The PDF(A) takes the remaining Authorization Tokens and contacts the remaining PDFs in order to receive policy information from those. That is, in the case as illustrated in FIG. 1, the PDF(A) contacts PDF(B), PDF(C) and PDF(D) in messages A3 to A5, respectively, and receives the policy information in messages A6 to A8, respectively.

The remaining PDFs addresses of PDF(B), PDF(C) and PDF(D) can be configured in the PDF(A) or the PDF(A) can make a DNS query based on the PDF FQDN (Fully Qualified Domain Name). All the subsequent GGSN requests will be sent to the PDF(A) and PDF(A) will trigger the request to the remaining PDFs. All the subsequent decisions from the PDFs will be triggered by the PDF(A) to the GGSN. Also the PDF(A) will trigger all the GGSN reports regarding changes related to the IP flows (carried by the PDP context) to the remaining PDFs.

In the present case, the policy decision is included in a message A9 sent from the selected PDF(A) to the GGSN. The GGSN sends the policy decision to the UE in message A10.

Hence, the handling of policy information in a system comprising a plurality of PDFs according to the first embodiment of the invention is uncomplicated. In particular, the UE does only have to send a single set-up request message in which all necessary Authorization Tokens are included. The GGSN does only have to contact one single PDF (i.e., PDF (A) which handles the policy information with respect to the other PDFs involved. The policy decision is again sent in a single message from the PDF(A) to the GGSN and finally to the UE. Thus, the procedure for obtaining a policy information is from the viewpoint of the UE almost the same as according to the prior art: it requires only a single message although a plurality of PDFs are involved.

According to a modification of the first embodiment, a default PDF is introduced. The default PDF IP address is configured to the GGSN access point basis. That is, the address of the default PDF is stored in the GGSN so that this address does not have to be derived from Authentication Tokens received from the UE, for example. The GGSN always contacts this default PDF which then contacts the correct PDFs in order to receive policy information from those. In this way, the load on the GGSN is reduced and only a single PDF has to perform contacting other PDFs.

That is, in case of the situation as illustrated in FIG. 1, PDF(A) could be such a default PDF. In this case, it is not necessary for the GGSN to derive the address of PDF(A) since it is already set as a default, and it is not necessary to process the corresponding Authentication Token in the GGSN, which reduces the operation load on the GGSN.

Alternatively to the above, according to a second embodiment of the present invention, the GGSN contacts the multiple PDFs. That is, it is possible for 3GPP R6 that the GGSN requests separate authorization decisions from the involved PDFs regarding the authorization of the IP flows associated with components from different application sessions carried by a single PDP context.

Figure 2:
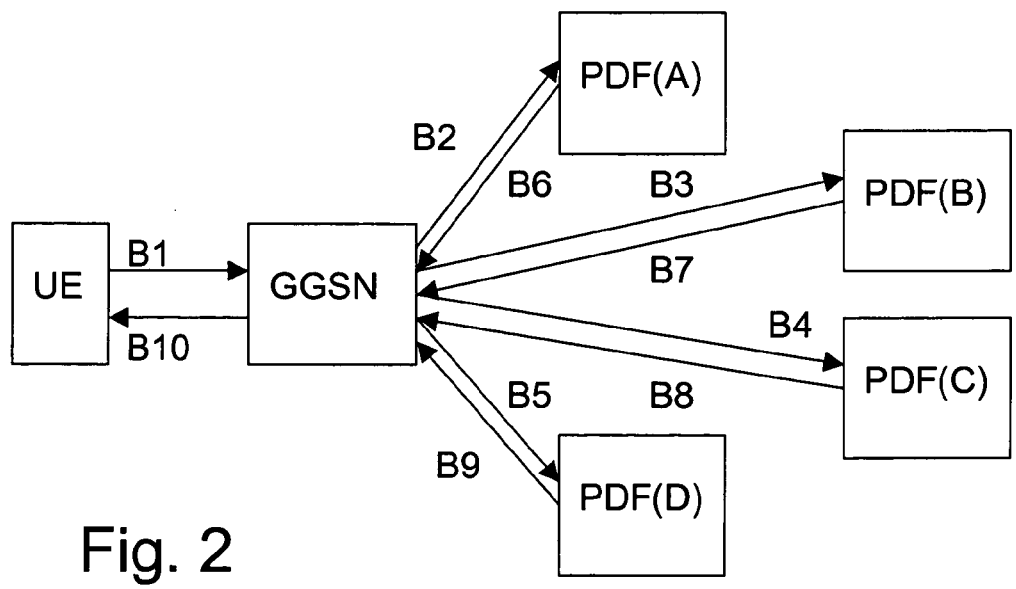
FIG. 2 shows a block diagram illustrating the procedure according to a second embodiment of the invention.

This situation is illustrated in FIG. 2. The system shown in FIG. 2 is similar to that shown in FIG. 1 except that the GGSN contacts the plurality of PDFs and not a selected PDF. The message B1 by which the UE requests a session set-up is the same as the message A1.

In contrast to the first embodiment, the GGSN considers all of the available Authorization Tokens in the PDP context and determines if different PDFs are involved.

The GGSN makes a separate authorization request including the binding information (the related Authorization Token and Flow Id(s)) to each of the concerned PDFs. This is illustrated in FIG. 2 by the messages B2 to B5, respectively. When the GGSN receives the authorization decisions from the PDFs (illustrated by messages B6 to B9), then it combines them into one authorization decision for the PDP context.

That is, the message B10 containing the authorization decision sent to the UE is the same as the message A10 shown in FIG. 1.

Thus, according to the second embodiment, the GGSN handles contacting of the different PDFs. This reduces the load on the PDF, since, in contrast to the first embodiment, there is no selected PDF(A) or a default PDF which needs to comprise also a functionality of contacting the other PDFs.

According to the first and the second embodiment described above, it is assumed that the PDFs reside in the same operator domain. In 3GPP R5, the PDF may reside either in the visited operator domain or in the home operator domain (depending on the GGSN location). In the future, i.e., in 3GPP R6, if the PDF resides in the visited operator domain, it may want to communicate with the PDF of the home operator domain (to receive UE specific policies from the home operator domain).

Using the Authorization Token in order to determine the PDF of the home operator domain requires some changes to the current mechanism in case of roaming UEs (i.e. UEs using the P-CSCF in the visited operator domain). According to the prior art (as described in the introductory part of the present application), the PDF in the P-CSCF allocates the Authorization Token.

However, in the future, i.e., when P-CSCF and PDF are separated, the Authorization Token may have to be allocated also in the home operator domain (so that the PDF in the visited operator domain can contact the PDF in the home operator domain).

This situation is described in the following as a third embodiment. It is noted that the way how the different PDF(s) located in the visited operator domain are accessed by the GGSN itself or the selected PDF(A) is the same as in the first embodiment and the second embodiment. In the present third embodiment, the creation of Authentication Tokens is described which require access to a home domain PDF.

According to the third embodiment, a node in the home operator domain forwarding SIP messages (e.g. S-CSCF) inserts the Authorization Token into the SIP messages (e.g., INVITE when establishing a session). The Authorization Token includes the PDF FQDN (Fully Qualified Domain Name). This PDF, i.e., the PDF in the home domain, stores UE specific information. In contrast thereto, the PDF(s) in the visited operator domain stores only session based information. For a policy decision, information of both PDF(s) located in the home domain and PDF(s) located in the visited operator domain might be necessary.

Figure 3:
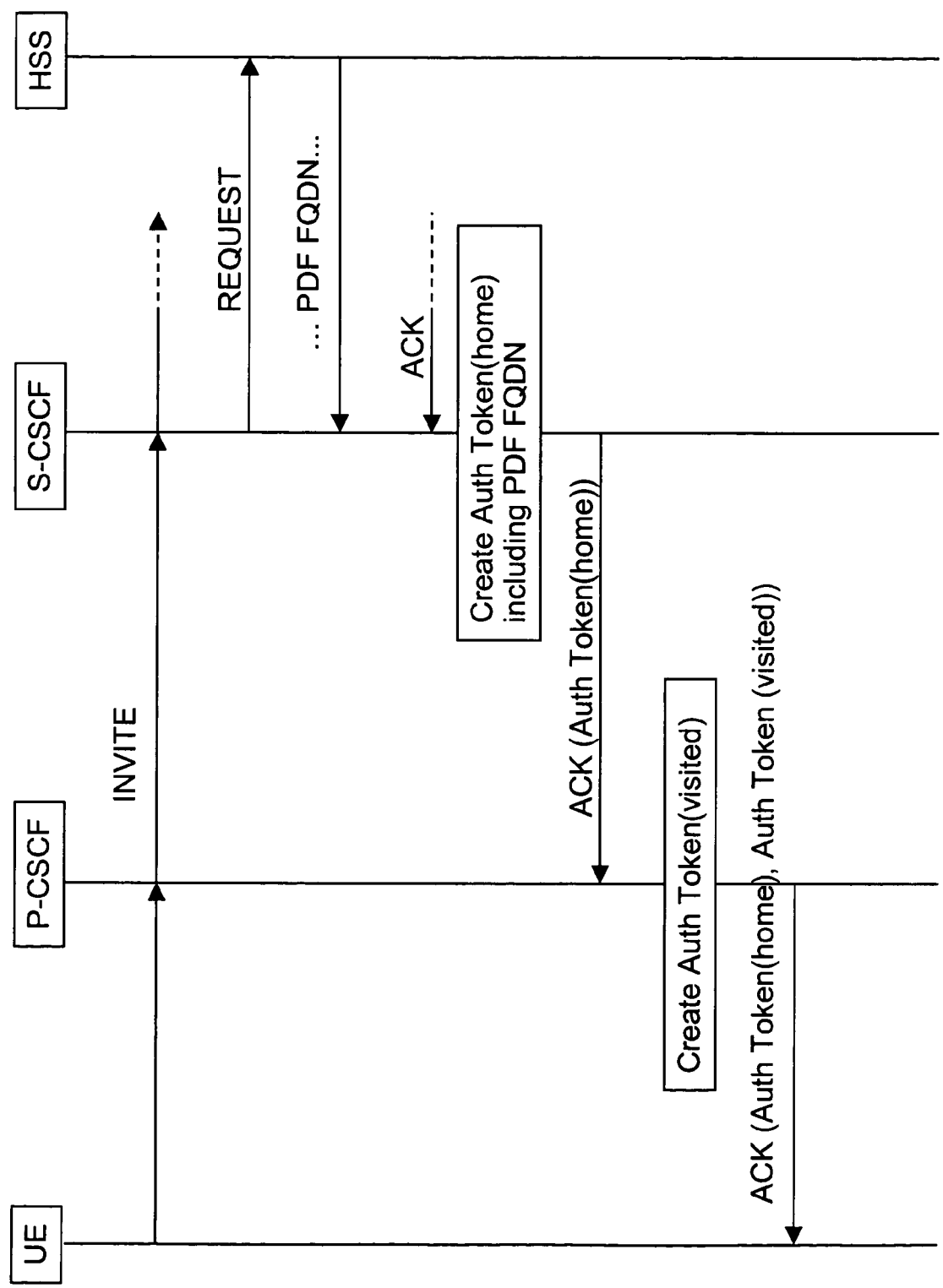
FIG. 3 shows a signalling flow diagram illustrating the procedure according to a third embodiment of the invention.

If the S-CSCF includes the Authorization Token to SIP messages, the S-CSCF may get the PDF fully qualified domain name e.g. from the HSS as indicated in FIG. 3.

FIG. 3 shows a principle structure how the Authentication Token is created. It is noted that only the network elements and the flow necessary for the invention are shown in order to simplify the illustration. The UE sends a SIP INVITE message to the P-CSCF of the visited operator domain. The P-CSCF forwards the INVITE message to the S-CSCF of the home domain. The S-CSCF further processes and forwards the session set-up (as indicated by the dotted arrow), in the following, however, only the creation of the authentication token is shown. The S-CSCF sends a SIP REQUEST message to the HSS of the subscriber (UE). The HSS responds with a the PDF FQDN. Hence, the S-CSCF knows the PDF FQDN and creates the Authentication Token of the home PDF (abbreviated as Auth Token (home) in FIG. 3) which includes the PDF FQDN. It is noted that also a plurality of Authentication Tokens (home) may be created in case a plurality of PDFs are provided in the home domain which contain relevant information for the session to be established by the particular subscriber.

Meanwhile, the S-CSCF receives a SIP ACK message during the remaining set-up of the session (as indicated by the dotted arrow). Thereafter, the S-CSCF inserts the Auth Token (home) into the SIP ACK message and forwards this to the P-CSCF in the visited operator domain. This P-CSCF also creates an Authentication Token for the visited operator domain (abbreviated as Auth Token (visited) in FIG. 3). It is noted that also a plurality of Auth Tokens (visited) may be created in case a plurality of PDFs in the visited operator domain are involved.

Finally, the P-CSCF inserts the created Auth Tokens (visited) into the SIP ACK messages and sends it to the UE. After this, the UE has received the necessary Authentication Tokens both of the visited and home domain such that it can start a session.

As an alternative, if the Authorization Token is not used to determine the PDF in the home operator domain, the PDF in the visited operator domain could perform a UE identity analysis (e.g. IMSI analysis) in order to determine the PDF in the home operator domain.

Thus according to the above embodiments, the GGSN can communicate with one PDF only and could receive policy information affecting an entity (e.g. a PDP context) from one network element (a selected PDF, a default PDF or the GGSN) only.

The above description and accompanying drawings only illustrate the present invention by way of example. Thus, the embodiment may vary within the scope of the attached claims.

For example, the PDF as described in the above embodiments is just an example for a node storing subscriber specific information in the home operator domain. HSS (Home Subscriber Server) is another example of such a node. That is, also the HSS could be provided in such a structure that different HSS servers are provided. In this case, the Authorization Token includes the HSS FQDN instead of the PDF FQDN.

Moreover, the GGSN is only an example for a network service element serving the user entity.

What is claimed is:

1. A method, comprising:
   receiving a policy request message at a first network node storing subscriber specific information which comprise policy information required for the session to be established;
   processing the policy request message to generate a policy decision message in the first network node;
   forwarding a policy request message from the first network node to at least one second network node storing subscriber specific information which comprise policy information required for a session to be established;
   processing the policy request message to generate a policy decision message in the at least one second network node and sending the policy decision message to the first network node from the at least one second network node having received the policy request message;
   generating a single policy decision confirmation message based on the received policy decision messages in the first network node; and
   sending the single policy decision message.

2. The method according to claim 1, further comprising selecting the first network node storing subscriber specific information by the network connection serving element serving a user entity.

3. The method according to claim 2, wherein the first node is a default network node storing subscriber specific information.

4. The method according to claim 1, wherein the single policy decision message comprises an authorization token from each node storing subscriber specific information.

5. The method according to claim 1, wherein a user entity is located in a visited operator domain, and the method further comprising:
   inserting policy information into a session set-up protocol message;
   sending the session set-up protocol message to a network control element in the home domain of the user entity;
   forwarding the policy information to a home subscriber database node;
   extracting an address of a home node storing subscriber specific information of the user entity from the subscriber database node;
   creating home policy information based on the extracted address; and
   forwarding the home policy information to a network control element of the visited network.

6. The method according to claim 5, wherein the policy information comprises an authentication token, and the home policy information created in the creating step comprises a home authentication token.

7. The method according to claim 5, further comprising:
   creating a visited policy information in the network control element of the visited network.

8. The method according to claim 5, wherein in the forwarding, the home policy information is inserted into another session set-up protocol message.

9. The method according to claim 5, wherein the session set-up protocol is a session initiation protocol (SIP).

10. The method according to claim 1, wherein the network node storing subscriber specific information is a policy control function (PDF).

11. An apparatus, comprising:
    a memory configured to store subscriber specific information comprising policy information required for a session to be established;
    a receiver configured to receive a session establishing policy request message;
    a processor configured to process the policy request message and to generate a policy decision;
    wherein the receiver is further configured to send a policy request message and to receive a policy decision message in response to the sent policy request message; and
    a generator configured to generate a single policy decision confirmation message based on the received policy decision messages and the policy decision generated by processor, and to send the single policy decision message.

12. The apparatus according to claim 11, wherein the receiver is configured to send the policy request message to at least one network node storing subscriber specific information which comprise policy information required for the session to be established, and to receive the policy decision message from this at least one network node.

13. The apparatus according to claim 11, wherein the single policy decision message comprises an authorization token from each node storing subscriber specific information.

14. The apparatus according to claim 11, wherein the network node storing subscriber specific information is a policy control function.

15. A method, comprising:
    receiving a policy request message at a first network node storing subscriber specific information comprising policy information required for a session to be established;
    processing the policy request message to generate a policy decision message in the first network node;
    sending a policy request message receiving a policy decision message in response to the sent policy request message; and
    generating a single policy decision confirmation message based on the received policy decision messages and the generated policy decision.

16. The method according to claim 15, wherein in sending the policy request message, at least one policy request message is sent to at least one second network node storing subscriber specific information which comprise policy information required for the session to be established, and in the receiving, the policy decision message is received from the at least one network node.

17. The method according to claim 15, wherein the single policy decision message comprises an authorization token from each node storing subscriber specific information.

18. The method according to claim 15, wherein the network node storing subscriber specific information is a policy control function.

19. An apparatus, comprising:
    storing means for storing subscriber specific information comprising policy information required for a session to be established;
    receiving means for receiving a policy request message;
    processing means for processing the policy request message and to generate a policy decision;
    sending means for sending the policy request message;
    receiving means for receiving a policy decision message in response to the sent policy request message;
    generating means for generating a single policy decision message based on the received policy decision messages and the policy decision generated by processor; and
    sending means for sending the single policy decision message.

* * * * *